US008867006B2

(12) United States Patent
Yamamoto et al.

(10) Patent No.: US 8,867,006 B2
(45) Date of Patent: Oct. 21, 2014

(54) LIQUID CRYSTAL DISPLAY DEVICE

(71) Applicants: Koji Yamamoto, Saitama-ken (JP);
Tetsuya Iizuka, Ishikawa-ken (JP)

(72) Inventors: Koji Yamamoto, Saitama-ken (JP);
Tetsuya Iizuka, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 77 days.

(21) Appl. No.: 13/761,872

(22) Filed: Feb. 7, 2013

(65) Prior Publication Data
US 2013/0278852 A1    Oct. 24, 2013

(30) Foreign Application Priority Data
Apr. 23, 2012   (JP) ................................. 2012-097771

(51) Int. Cl.
*G02F 1/1343*    (2006.01)
*G02F 1/1368*    (2006.01)
*G02F 1/1362*    (2006.01)

(52) U.S. Cl.
CPC ................................ *G02F 1/136286* (2013.01)
USPC ............... 349/141; 349/39; 349/43; 349/138; 349/139

(58) Field of Classification Search
CPC ..................... G02F 1/136286; G02F 1/134363; G02F 1/136213; G02F 1/1368; G02F 2001/136218; G02F 2001/134318; G02F 2001/134381
USPC ........ 349/39, 43, 138, 139, 141, 143; 257/59, 257/72; 345/92
See application file for complete search history.

(56) References Cited

U.S. PATENT DOCUMENTS

| 6,266,116 | B1 | 7/2001 | Ohta et al. | |
|---|---|---|---|---|
| 8,421,976 | B2* | 4/2013 | Hirosawa | 349/141 |
| 8,692,947 | B2* | 4/2014 | Hirosawa | 349/34 |
| 2001/0010575 | A1 | 8/2001 | Yoshida et al. | |
| 2004/0165136 | A1 | 8/2004 | Sugiyama et al. | |
| 2005/0206824 | A1 | 9/2005 | Son et al. | |
| 2005/0219453 | A1 | 10/2005 | Kubo et al. | |
| 2007/0115234 | A1 | 5/2007 | Kim et al. | |
| 2008/0062358 | A1 | 3/2008 | Lee et al. | |
| 2008/0180590 | A1 | 7/2008 | Lee et al. | |
| 2008/0180623 | A1 | 7/2008 | Lee et al. | |
| 2008/0186439 | A1 | 8/2008 | Kwon et al. | |
| 2009/0122247 | A1* | 5/2009 | Chang | 349/139 |
| 2010/0091231 | A1* | 4/2010 | Nishimura et al. | 349/139 |
| 2013/0010235 | A1* | 1/2013 | Hirosawa et al. | 349/96 |
| 2013/0027643 | A1* | 1/2013 | Hirosawa | 349/99 |

FOREIGN PATENT DOCUMENTS

| JP | 6-222397 | 8/1994 |
|---|---|---|
| JP | 7-159807 | 6/1995 |

(Continued)

*Primary Examiner* — Dung Nguyen
*Assistant Examiner* — Tai Duong
(74) *Attorney, Agent, or Firm* — Oblon, Spivak, McClelland, Maier & Neustadt, L.L.P.

(57) ABSTRACT

In one embodiment, a first shield electrode and a second shield electrode are arranged on a first substrate. A first source line and a second source line are arranged facing the first and second shield electrodes through an insulating layer, respectively. A first main common electrode and a second main common electrode are formed facing the first and second source lines through an insulating layer, respectively. A main pixel electrode is formed so as to locate between the first and second main common electrodes. A second substrate includes a third main common electrode and a fourth main common electrode facing the first and second main common electrodes, respectively. A liquid crystal layer is held between the first and second substrates. The first, second, third and fourth main common electrodes are set to the same electric potential.

16 Claims, 11 Drawing Sheets

(56) References Cited

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

* cited by examiner

US 8,867,006 B2

LIQUID CRYSTAL DISPLAY DEVICE

CROSS-REFERENCE TO RELATED APPLICATION

This application is based upon and claims the benefit of priority from prior Japanese Patent Application No. 2012-097771 filed Apr. 23, 2012, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
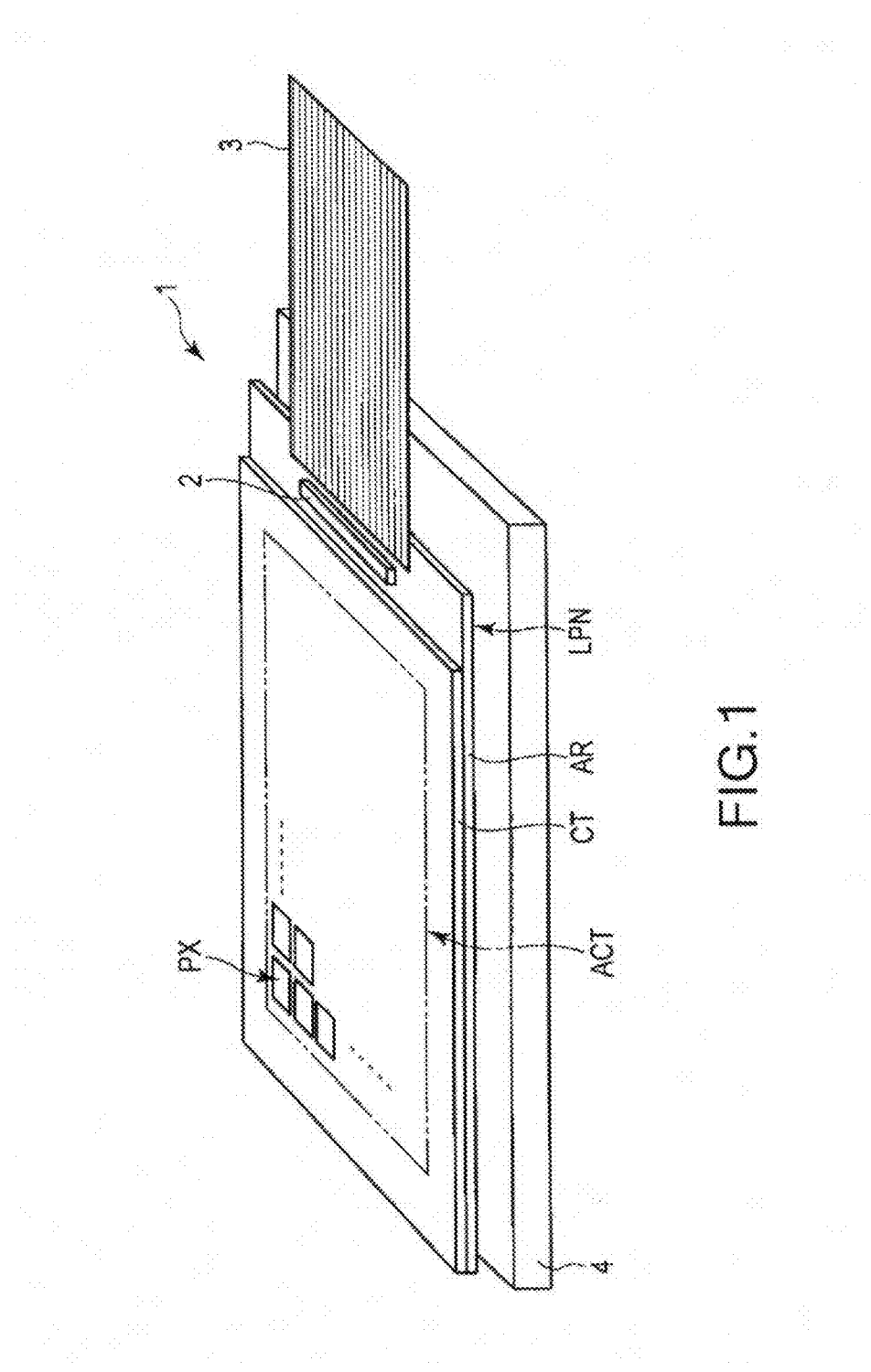
FIG. 1 is a view schematically showing a structure of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first insulating layer, a first shield electrode and a second shield electrode arranged on the first insulating layer and extending along a first direction, the first and second shield electrodes locating apart from each other in a second direction orthogonally crossing the first direction, an auxiliary capacitance line arranged on the first insulating layer and extending in the second direction, the auxiliary capacitance line integrally formed with the first and second shield electrodes, a second insulating layer formed on the first insulating layer and the first and second shield electrodes, a first source line arranged on the second insulating layer facing the first shield electrode and extending in the first direction, a second source line arranged on the second insulating layer facing the second shield electrode and extending in the first direction, a third insulating layer formed on the second insulating layer and the first and second source lines, a first main common electrode formed on the third insulating layer facing the first source line and extending in the first direction, a second main common electrode formed on the third insulating layer facing the second source line and extending in the first direction, a main pixel electrode formed on the third insulating layer so as to locate between the first and second main common electrodes and extend in the first direction, and a second substrate including; a third main common electrode facing the first main common electrode and extending in the first direction, a fourth main common electrode facing the second main common electrode and extending in the first direction, and a liquid crystal layer held between the first and second substrates and having liquid crystal molecules; wherein the first, second, third and fourth main common electrodes are set to the same electric potential.

According to other embodiment, a liquid crystal display device includes: a first substrate including; a first insulating layer, a shield electrode arranged on the first insulating layer and extending along a first direction, an auxiliary capacitance line arranged on the first insulating layer and extending in a second direction orthogonally crossing the first direction, the auxiliary capacitance line integrally formed with the shield electrode, a second insulating layer formed on the first insulating layer and the shield electrode, a source line arranged on the second insulating layer facing the shield electrode and extending in the first direction, a third insulating layer formed on the second insulating layer and the source line, a first main common electrode formed on the third insulating layer facing the source line and extending in the first direction, a main pixel electrode formed on the third insulating layer apart from the first main common electrode in the second direction and extending in the first direction, and a second substrate including; a second main common electrode facing the first main common electrode and extending in the first direction, a liquid crystal layer held between the first and second substrates and having liquid crystal molecules; wherein the first and second main common electrodes are set to the same electric potential.

FIG. 1 is a figure schematically showing a structure of the liquid crystal display device 1 according to one embodiment.

The liquid crystal display device 1 includes an active-matrix type liquid crystal display panel LPN, a driving IC chip 2 connected with the liquid crystal display panel LPN and a flexible wiring board 3, a backlight unit 4 for illuminating the liquid crystal display panel LPN, etc., as shown in FIG. 1.

The liquid crystal display panel LPN is equipped with an array substrate AR as a first substrate, a counter substrates CT as a second substrate arranged opposing the array substrate AR, and a liquid crystal layer held between the array substrate AR and the counter substrate CT, which is not shown. The liquid crystal display panel LPN includes an active area ACT which displays images. The active area ACT is constituted by a plurality of pixels PX arranged in the shape of a (m×n) matrix (here, "m" and "n" are positive integers).

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

Figure 2:
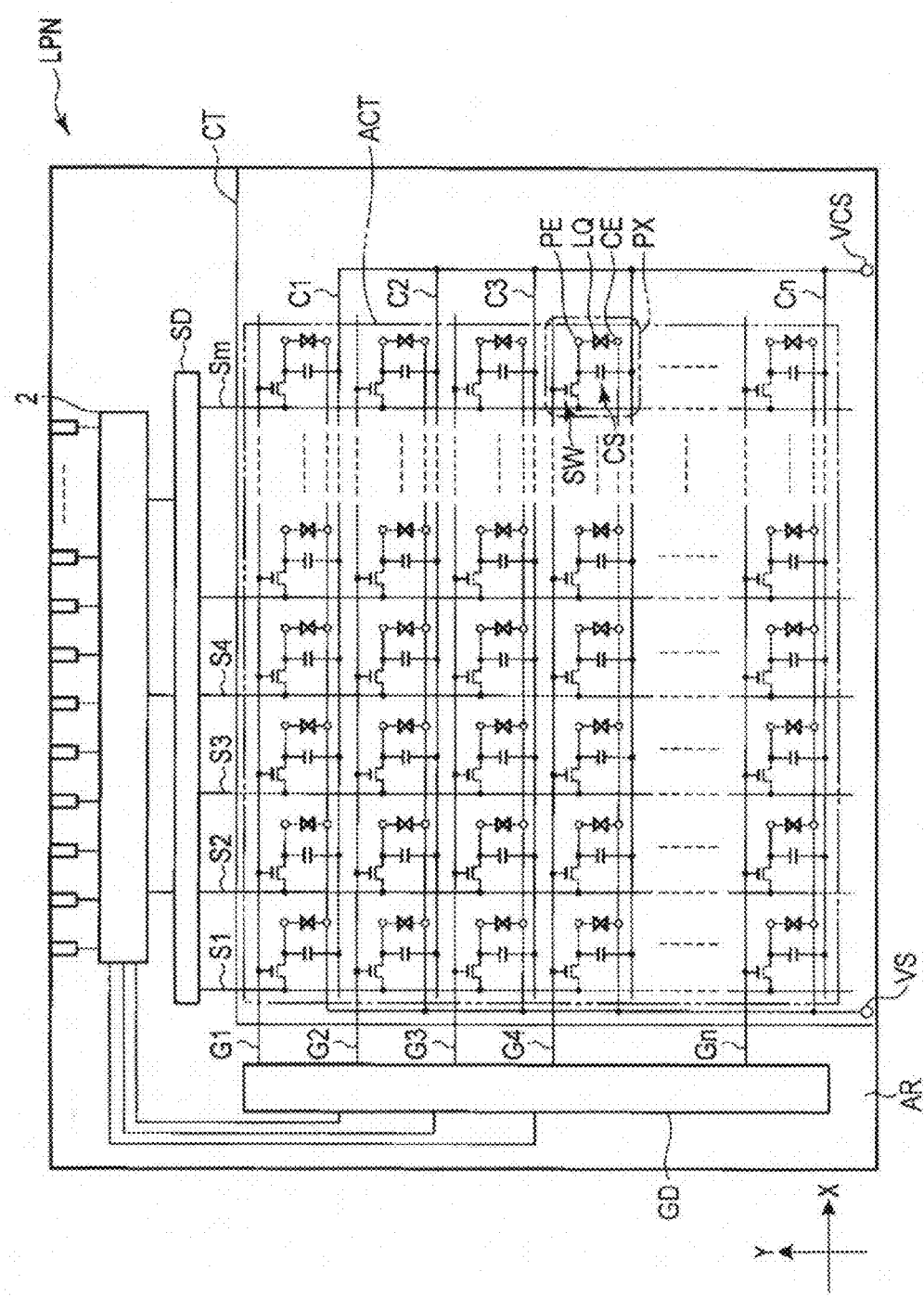
FIG. 2 is a view schematically showing a structure and the equivalent circuit of a liquid crystal display panel shown in FIG. 1.

FIG. 2 is a figure schematically showing a structure and the equivalent circuit of the liquid crystal display panel shown in FIG. 1. The liquid crystal display panel LPN is equipped with "n" gate lines G (G1-Gn), "n" auxiliary capacitance lines C (C"m" source lines S (S1-Sm), etc., in the active area ACT. The gate line G and the auxiliary capacitance line C are arranged in turns along a first direction Y. The gate line G and the auxiliary capacitance line C extend in parallel in a second direction X that orthogonally intersects the first direction Y, respectively. The source lines S cross the gate line G and the capacitance line C. The source lines S extend linearly in the first direction Y, respectively. The gate line G, the auxiliary capacitance line C and the source lines S do not necessarily extend linearly, and a portion thereof may be crooked partially.

Each gate line G is pulled out to outside of the active area ACT, and connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel includes a switching element SW, a pixel electrode PE, a common electrode CE, etc. The auxiliary capacitance CS is formed between the auxiliary capacitance line C and an auxiliary capacitance electrode F to be explained later.

In addition, in the liquid crystal display panel LPN according to this embodiment, while the pixel electrode PE is formed in the array substrate AR, the common electrode CE is formed in the counter substrate CT and the array substrate AR. Liquid crystal molecules of the liquid crystal layer LQ are switched mainly using electric field formed between the pixel electrode PE and the common electrode CE. The electric field formed between the pixel electrode PE and the common electrode CE is lateral electric field in parallel with principle surfaces of the array substrate AR and the counter substrate CT or an oblique electric field slightly oblique with respect to the principle surfaces of the array substrate AR and the counter substrate CT.

The switching element SW is constituted by an n channel type thin film transistor (TFT), for example. The switching element SW is electrically connected with the gate line G and the source line S. The (m×n) switching elements SW are formed in the active area ACT.

The pixel electrode PE is electrically connected with the switching element SW. (m×n) pixel electrodes are formed in the active area ACT. The common electrode CE is arranged in common to the plurality of pixel electrodes PE through the liquid crystal layer LQ. Common potential is impressed to the common electrode CE. The auxiliary capacitance line C is electrically connected with an electric potential impressing portion VCS to which auxiliary capacitance voltage is impressed.

The array substrate AR includes an electric power supply portion VS formed outside of the active area ACT. A portion of the common electrode CE formed in the array substrate AR is electrically connected with the electric power supply portion VS outside of the active area ACT. Furthermore, a portion of the common electrode CE formed in the counter substrate CT is electrically connected with the electric power supply portion VS formed in the array substrate AR through an electric conductive element.

Figure 3:
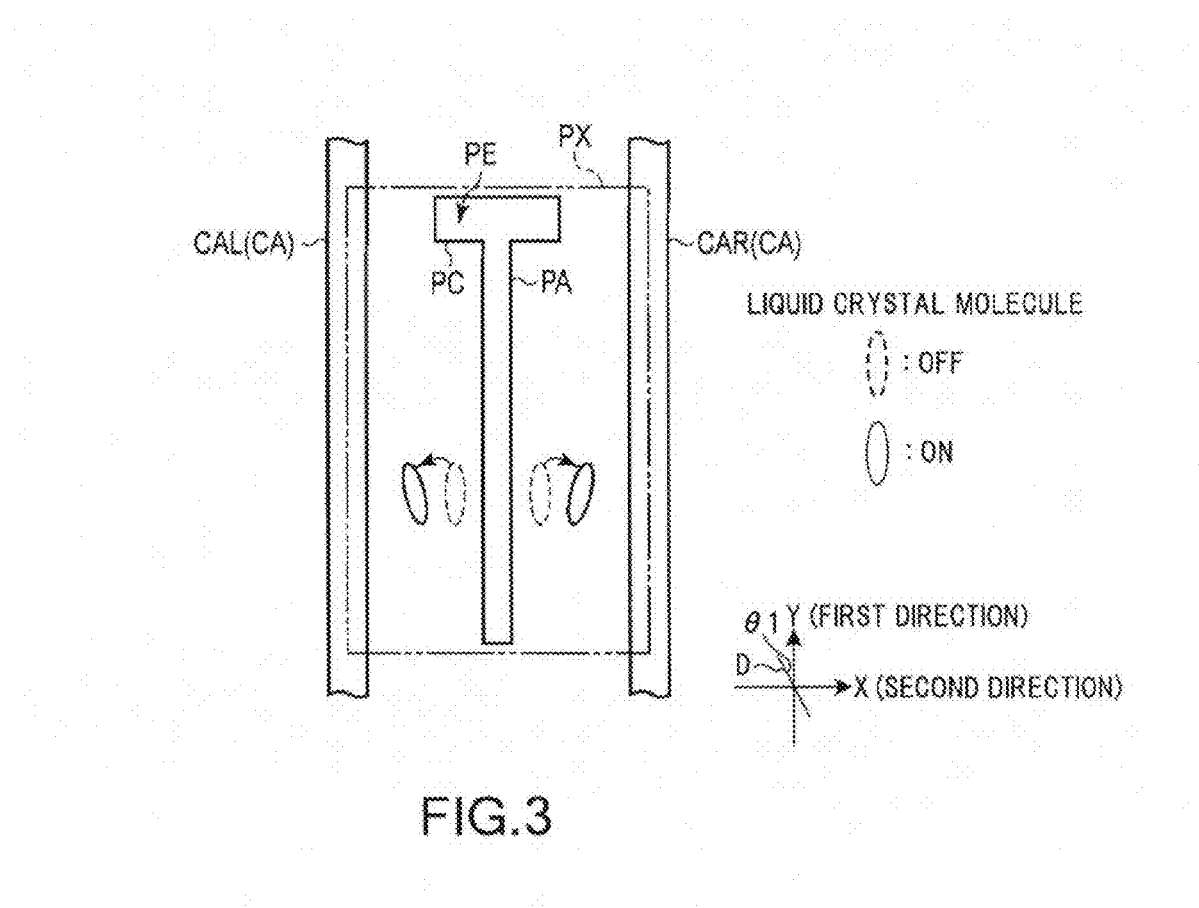
FIG. 3 is a view schematically showing a structure of minimum unit in one pixel in the display panel shown in FIG. 1.

Hereinafter, a basic structure according to the embodiment is explained. FIG. 3 is a figure schematically showing a structure of minimum unit in one pixel in the display panel.

As shown in FIG. 3, the pixel PX corresponds to an area shown with a two-dot chain line in the figure, and is formed of a rectangular shape whose length in the first direction Y is larger than the distance in the second direction X. The pixel electrode PE includes a main pixel electrode PA and a sub-pixel electrode PC. The main pixel electrode PA and the sub-pixel electrode PC are electrically connected each other. In this embodiment, the array substrate AR is equipped with the whole of the pixel electrode PE.

The main pixel electrode PA extends along the first direction Y. The sub-pixel electrode PC extends along the second direction X different from the first direction Y. More specifically, the main pixel electrode PA is formed in the shape of a belt linearly extending along the first direction Y substantially in the central portion of the pixel. The sub-pixel electrode PC is formed in the shape of a belt linearly extending along the second direction X in an upper end portion of the pixel PX. In addition, the sub-pixel electrode PC may be arranged between up-and-down pixels. That is, the sub-pixel electrode PC may be arranged striding over a boundary between the illustrated pixel PX and the pixel arranged in the upper portion (not shown).

The sub-pixel electrode PC is combined with one end portion of the main pixel electrode PA, and extends from the main pixel electrode PA toward both sides thereof. The sub-pixel electrode PC orthogonally crosses the main pixel electrode PA. In addition, the sub-pixel electrode PC may be combined with another end portion side rather than one end portion of the main pixel electrode PA. The pixel electrode PE is electrically connected with the auxiliary capacitance electrode F (not shown) at the sub-pixel electrode PC, for example.

The common electrode CE includes a plurality of main common electrodes CA. The main common electrodes CA are electrically connected each other. The common electrode CE is electrically insulated from the pixel electrode PE. In this embodiment, at least a portion of the main common electrode CA in the common electrode CE is formed on the counter substrate CT.

The main common electrode CA extends along the first direction Y. In this embodiment, the main common electrode CA is formed in the shape of a belt linearly extending along the first direction Y. In addition, the main common electrode CA is arranged in two parallel lines. Hereinafter, in order to distinguish the two main common electrodes CA respectively, the main common electrode of the left-hand side in the figure is called CAL, and the main common electrode of the right-hand side in the figure is called CAR.

The main common electrode CAL and the main common electrode CAR are arranged between adjacent right-and-left pixels. That is, the main common electrode CAL is arranged striding over a boundary between the illustrated pixel PX and the pixel (not shown) on the left-hand side, and the main common electrode CAR is arranged striding over a boundary between the illustrated pixel PX and the pixel (not shown) on the right-hand side.

The pair of main common electrodes CA is arranged so as to sandwich the main pixel electrode PA. That is, the main common electrode CA and the main pixel electrode PA are arranged by turns along the second direction X. The main pixel electrode PA and the pair of main common electrodes CA are arranged approximately in parallel each other. At this time, in a X-Y plane, none of the main common electrodes CA overlaps with the main pixel electrode PA in the X-Y plane, and an aperture which mainly contributes to the display is formed between each of the main common electrodes CA and the main pixel electrode PA.

That is, one main pixel electrode PA is located between the adjoining main common electrode CAL and main common electrode CAR. In other word, the main common electrode CAL and the main common electrode CAR are arranged at the both sides which sandwich the main pixel electrode PA. For this reason, the main common electrode CAL, the main pixel electrode PA, and the main common electrode CAR are arranged along the second direction X in this order.

The distance between the main common electrode CAL and the main pixel electrode PA is substantially the same as the distance between the main common electrode CAR and the main pixel electrode PA in the second direction X. Apertures are formed between the main common electrode CAL and the main pixel electrode PA, and between the main pixel electrode PA and the main common electrode CAR, respectively. That is, in the example shown here, two apertures are formed in one pixel PX.

In this embodiment, initial alignment direction of the liquid crystal molecule LM is substantially in parallel with the first direction Y, however, may be an oblique direction D obliquely crossing the first direction Y. Here, the angle $\theta 1$ between the first direction Y and the initial alignment direction D is set to an angle larger than 0° and smaller than 45°. From a viewpoint of alignment control of the liquid crystal molecules, it is extremely effective that the angle $\theta 1$ is set to approximately 5° to 25°, and more preferably, around 10°. Here, the angle $\theta 1$ is a slightly oblique direction by about several degrees, for example, 7°, with respect to the first direction Y.

In addition, the pixel electrode PE may be further equipped with the sub-pixel electrode PC which extends along the second direction X. Moreover, the common electrode CE may be further equipped with a sub-common electrode which extends along the second direction X, as needed.

Figure 4:
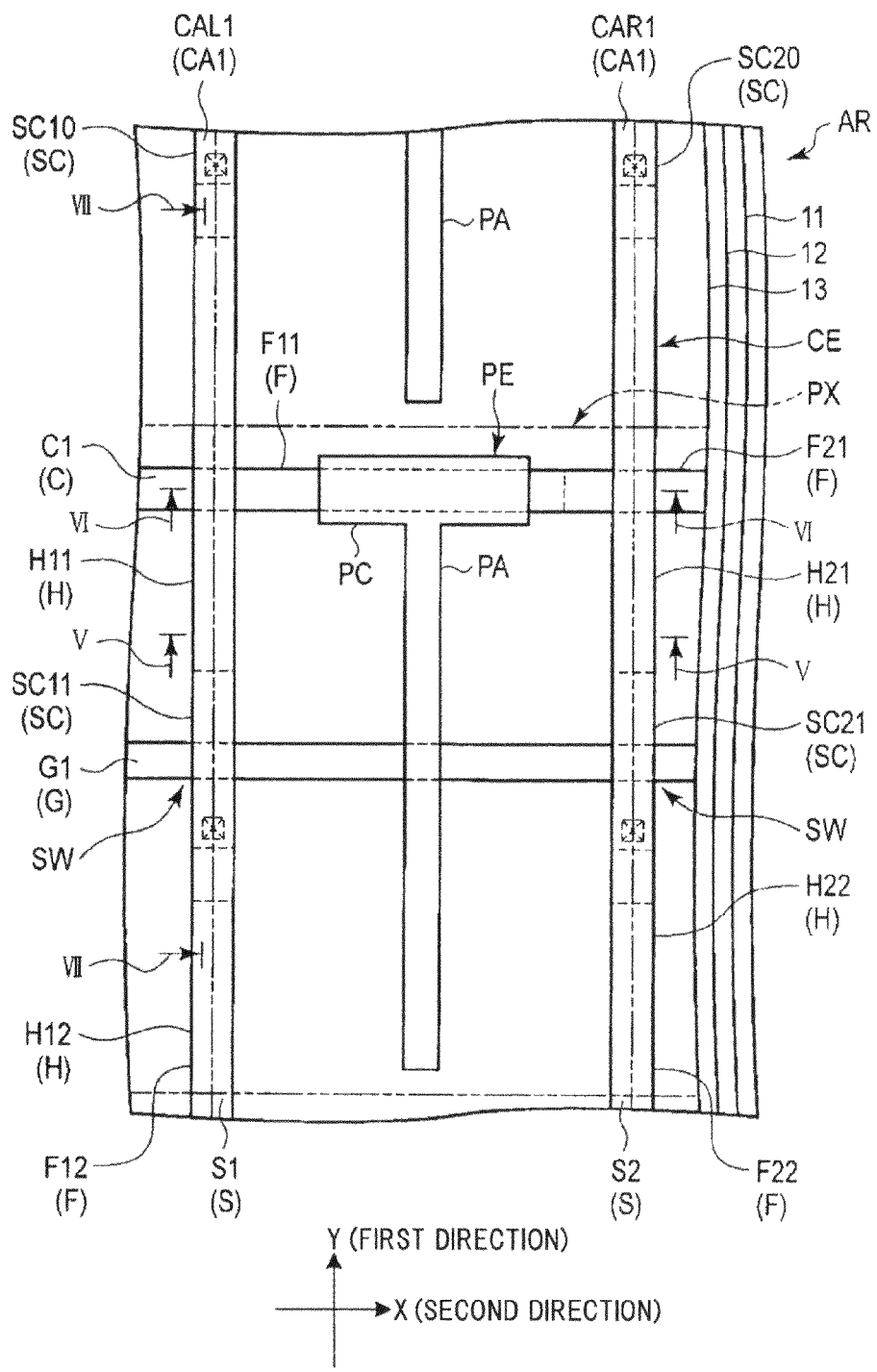
FIG. 4 is a view schematically showing one pixel in the display panel according to the embodiment.
Figure 5:
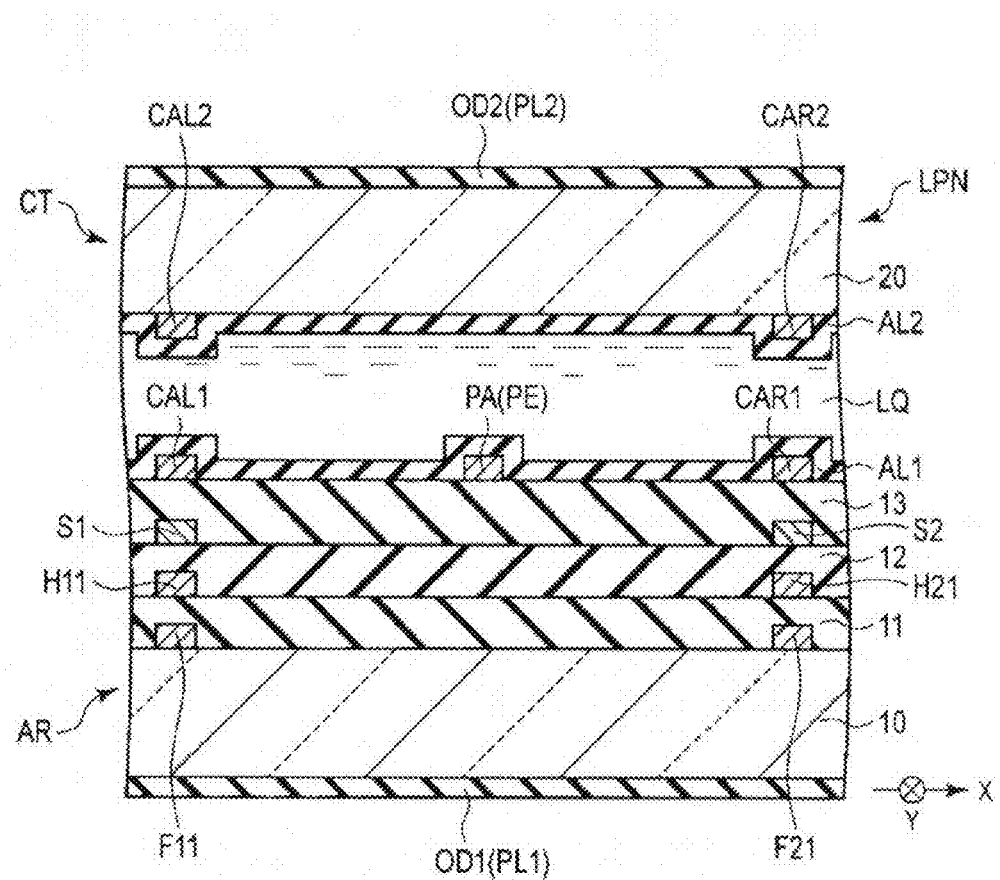
FIG. 5 is a figure schematically showing a cross-sectional view of the liquid crystal display panel taken along line V-V in FIG. 4.
Figure 6:
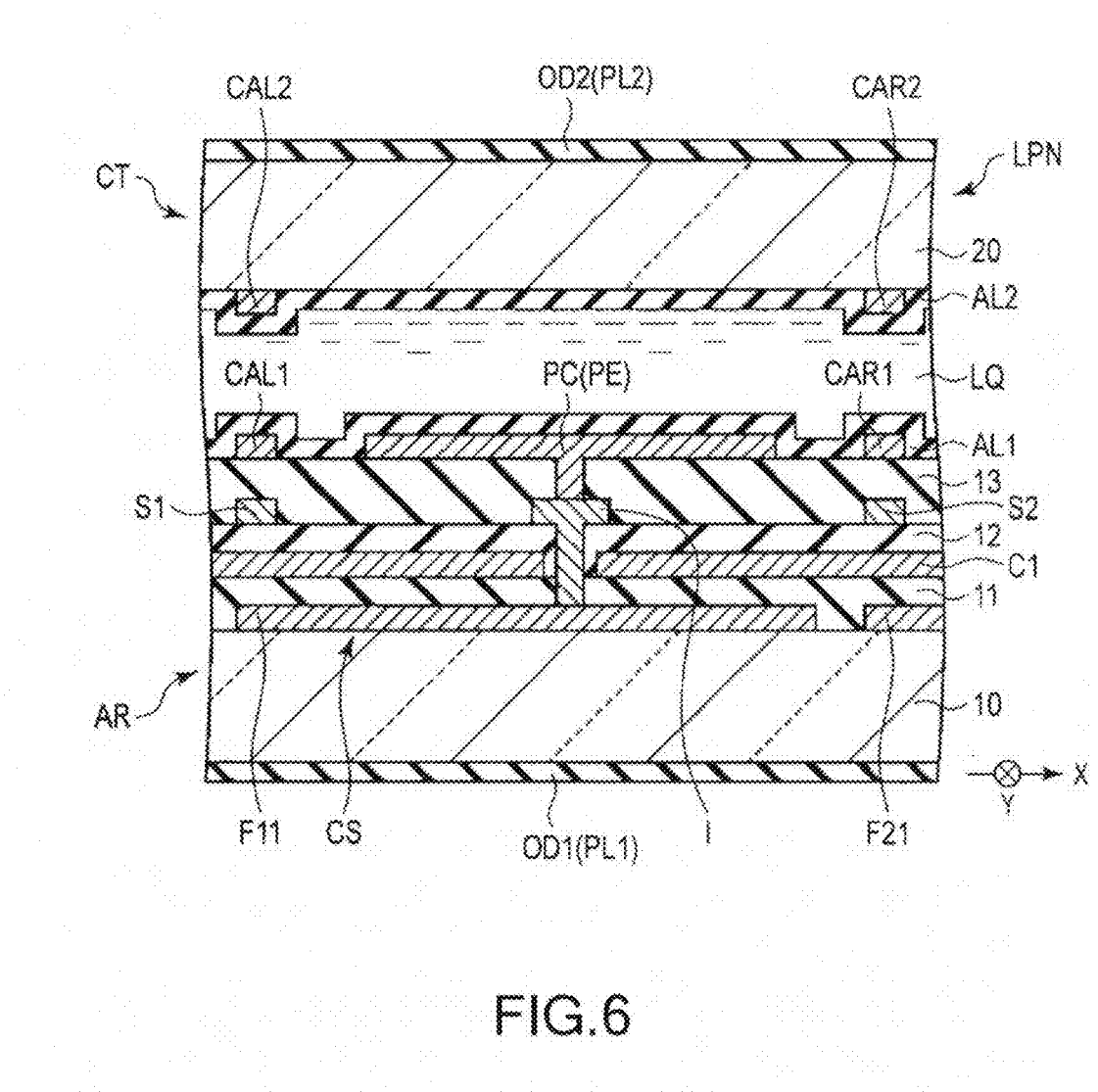
FIG. 6 is a figure schematically showing a cross-sectional view of the liquid crystal display panel taken along line VI-VI in FIG. 4.
Figure 7:
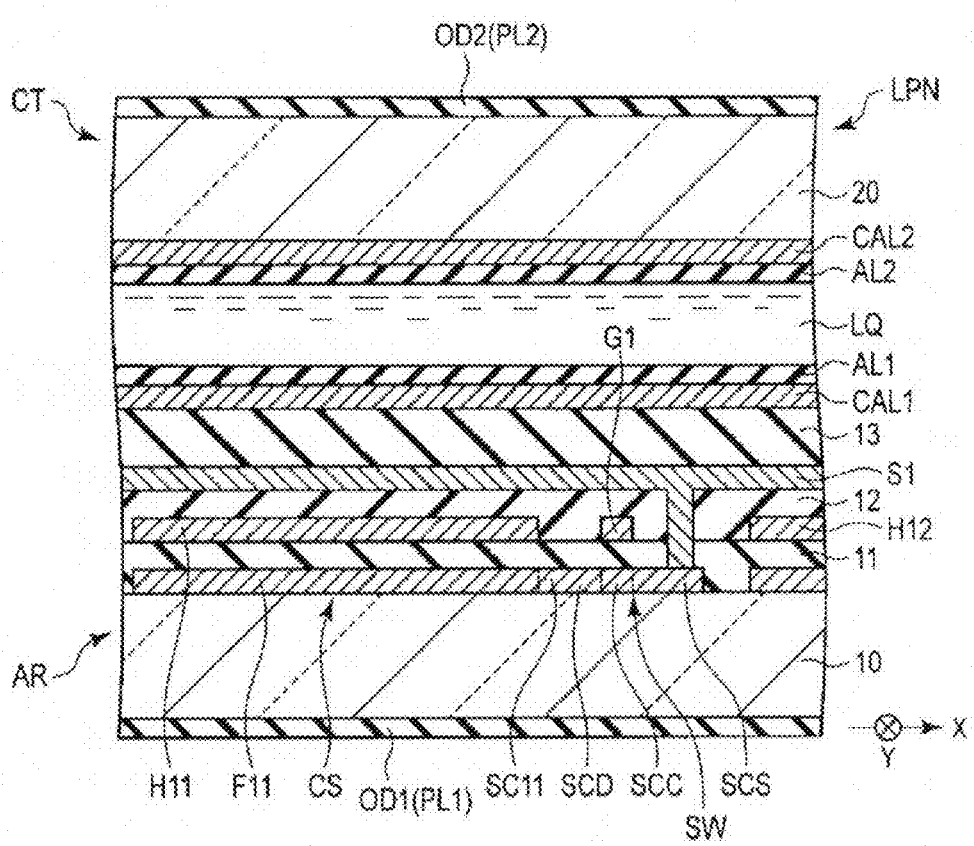
FIG. 7 is a figure schematically showing a cross-sectional view of the liquid crystal display panel taken along line VII-VII in FIG. 4.

FIG. 4 is a figure schematically showing one pixel in the display panel LPN. In addition, in FIG. 4, the structure only on the array substrate AR side is shown. FIG. 5 is a figure schematically showing a cross-sectional view of the liquid crystal display panel taken along line V-V in FIG. 4. FIG. 6 is a figure schematically showing a cross-sectional view of the liquid crystal display panel taken along line VI-VI in FIG. 4. FIG. 7 is a figure schematically showing a cross-sectional view of the liquid crystal display panel taken along line VII-VII in FIG. 4.

As shown in FIGS. 4, 5, 6 and 7, the array substrate AR is formed using an insulating substrate 10 having a light transmissive characteristic, such as a glass substrate and a plastic substrate. The array substrate AR includes the switching element SW, the auxiliary capacitance line C, a shield electrode H, the pixel electrode PE, a main common electrode CA1, a first alignment film AL1, etc., formed on the first insulating substrate 10 facing the counter substrate CT.

On the first insulating substrate 10, an auxiliary capacitance electrode F and a semiconductor layer SC are formed. An undercoat layer formed of insulating material may be arranged between the insulating substrate 10 and the auxiliary capacitance electrode F, and between the insulating substrate 10 and the semiconductor layer SC. In FIG. 4, four auxiliary capacitance electrodes F and four semiconductor layers SC are shown.

The auxiliary capacitance electrode F has a form which is made by rotating T character to left by 90°. The auxiliary capacitance electrode F11 counters the first shield electrode H11 and the auxiliary capacitance line C1, In addition, the auxiliary capacitance electrode F21 counters the second shield electrode H21 and the auxiliary capacitance line C1. The auxiliary capacitance electrode F11 and the auxiliary capacitance electrode F21 are electrically insulated each other.

A region of the auxiliary capacitance electrode F11 facing the first main common electrode CAL1 (to be explained later) is arranged directly under the first shield electrode H11 and has substantially the same width as the width of the first source line S1. A region of the auxiliary capacitance electrode F11 facing the auxiliary capacitance line C1 is arranged directly under the auxiliary capacitance line C1 and has substantially the same width as the width of the auxiliary capacitance line C1.

The semiconductor layer SC is formed in the same layer as the auxiliary capacitance electrode F, and formed with the same material as the auxiliary capacitance electrode F. In this embodiment, although the auxiliary capacitance electrode F and the semiconductor layer SC are formed with poly-silicon, they may be formed of amorphous silicon. The semiconductor layer SC includes a source region SCS electrically connected with the source line S, a drain region SCD continuously formed with the auxiliary capacitance electrode, and a channel region SCC. The semiconductor layer SC counters with the source line S.

The semiconductor layer SC11 counters with the first source line 51, and the source region SCS of the semiconductor layer SC11 is electrically connected with the first source line S1. The source region SCS of the semiconductor layer SC11 and the auxiliary capacitance electrode F12 are insulated electrically. Moreover, the auxiliary capacitance electrode F11 and the source region SCS of the semiconductor layer SC10 is also electrically insulated. In addition, a semiconductor layer SC21, etc., are formed like the semiconductor layer SC11. The semiconductor layer SC21 counters with the second source line S2. The auxiliary capacitance electrode F and the semiconductor layer SC are covered with a gate insulating film 11 as a first insulating film. Moreover, the gate insulating film 11 is arranged also on the first insulating substrate 10.

On the gate insulating film 11, the shield electrode H, the auxiliary capacitance line C, and the gate line G are formed. FIG. 4 shows four shield electrodes H.

The auxiliary capacitance line C1 extends along the second direction X and is integrally formed with the first shield electrode H11 and the second shield electrode H21, etc. In each pixel PX, the auxiliary capacitance line C1 is arranged at the upper end portion. In addition, the auxiliary capacitance line C1 may be arranged striding over a boundary between the illustrated pixel PX and the adjoining pixel arranged in the upper portion.

The first shield electrode H11 and the second shield electrode H21 extend along the first direction Y and are arranged keeping a fixed interval in the second direction X mutually. The first shield electrode H11 and the second shield electrode H21 are formed so that they may project in the first direction Y from the auxiliary capacitance line C1.

The first shield electrode H11 counters with the auxiliary capacitance electrode F11. The auxiliary capacitance electrode F11, the first shield electrode H11, and the auxiliary capacitance line C1 form auxiliary capacitance CS. The second shield electrode H21 counters with an auxiliary capacitance electrode F21. In addition, the auxiliary capacitance electrode F21, the second shield electrode H21, and the auxiliary capacitance line C1 also form auxiliary capacitance CS of the adjacent pixel PX.

The above-mentioned first shield electrode H11 is arranged directly under the first source line S1 to be mentioned later, and has substantially the same width as the width of the first source line S1. The second shield electrode H21 is arranged directly under the second source line S2, and has substantially the same width as the width of the first source line S2.

The gate line G is formed in the same layer as the shield electrode H and the auxiliary capacitance line C. The gate line G extends along the second direction X. The gate line G1 counters with the channel region SCC of the semiconductor layer SC11 through the gate insulating film 11. In the pixel PX, the gate line G1 is arranged substantially in the center portion of the pixel. The gate line G1 is located on the channel region SCC of the semiconductor layer SC11. The semiconductor layer SC11 and the gate line G1 form the switching element SW. In the illustrated example, although the switching element SW is formed of a thin film transistor of a top-gated type, it may be a bottom-gated type.

In addition, the gate line G1 counters with the channel region SCC of the semiconductor layer SC21, etc. The gate line G1 and the semiconductor layer SC21 form the switching element SW of the adjacent pixel PX. The shield electrode H, the auxiliary capacitance line C, and the gate line G can be formed in the same process using the same material.

A first interlayer insulating film 12 as a second insulating film is formed on the gate insulating film 11, the shield electrode H, the auxiliary capacitance line C, and the gate line G. The shield electrode H, the auxiliary capacitance line C, and the gate line G are covered with the first interlayer insulating film 12. Moreover, the first interlayer insulating film 12 is arranged also on the gate insulating film 11. In addition, the gate insulating film 11 and the first interlayer insulating film 12 are formed of an insulating material of inorganic systems, such as silicon oxide and silicon nitride.

On the first interlayer insulating film 12, the source line S and a connection electrode I are formed. The source line S extends along the first direction Y. In addition, the illustrated source line S is arranged in two lines in parallel with the second direction X. Hereinafter, in order to distinguish, the source line S of the left-hand side in the figure is called a first source line S1, and the source line S of the right-hand side in the figure is called a second source line S2. The first source line S1 counters with the first shield electrode H11. A portion of the first source line S1 is connected to the source region SCS of the semiconductor layer SC11 through a contact hole which penetrates the gate insulating film 11 and the first interlayer insulating film 12.

The second source line S2 counters with the second shield electrode H21. A portion of the second source line S2 is connected to the source region SCS of the semiconductor layer SC21 through a contact hole which penetrates the gate insulating film 11 and the first interlayer insulating film 12.

In the pixel PX, the first source line S1 is arranged at the left-hand side end. Precisely, the first source line S1 is arranged striding over a boundary between the illustrated pixel and an adjoining pixel PX arranged on the left-hand side. The second source line S2 is arranged at the right-hand side end. Precisely, the second source line S2 is arranged striding over a boundary between the illustrated pixel and an adjoining pixel PX arranged on the right-hand side.

The connection electrode I counters with the auxiliary capacitance line C1. The connection electrode I is connected with the auxiliary capacitance electrode F11 through a contact hole which penetrates the gate insulating film 11 and the first interlayer insulating film 12. The connection electrode I is electrically insulated from the auxiliary capacitance line C1.

The source line S and the connection electrode I can be formed in the same process using the same material. The source line S and the connection electrode I are formed of electric conductive materials, such as molybdenum, aluminum, tungsten, and titanium.

A second interlayer insulating film 13 as a third insulating film is formed on the first interlayer insulating film 12, the source line S, and the connection electrode I. The source line S and the connection electrode I are covered with the second interlayer insulating film 13. Moreover, the second interlayer insulating film 13 is arranged also on the first interlayer insulating film 12. The second interlayer insulating film 13 is formed of various organic materials, such as ultraviolet curing type resin and thermosetting type resin, for example.

On the second interlayer insulating film 13, a main common electrode CA1 and the pixel electrode PE are formed. The main common electrode CA1 extends along the first direction Y. In addition, the illustrated main common electrode CA1 is located in two lines in parallel to the second direction X. hereinafter, in order to distinguish the two lines, the main common electrode CA1 of the left-hand side in the figure is called a first main common electrode CAL1, and the main common electrode CA1 of the right-hand side in the figure is called a second main common electrode CAR1. The first main common electrode CAL1 counters with the first source line S1. The first main common electrode CAL1 is arranged right above the first source line S1 and has substantially the same width as the width of the first source line S1. The second main common electrode CAR1 counters with the second source line S2. The second main common electrode CAR1 is arranged right above the second source line S2, and has substantially the same width as the width of the second source line S2. Although the main common electrode CA1 of the common electrode CE is not explained in detail, the main common electrode CA1 is drawn to the outside of the active area ACT and electrically connected with the electric supply portion of the array substrate. Common potential is supplied to the main common electrode CA1.

In the active area, in case where the first common electrode CAL1 covers the first source line S1, and the second main common electrode CAR1 covers the second source line S2, the width in the second direction X of the first main common electrode CAL1 is equal to or larger than the width of the first source line S1 in the second direction X. The width of the second main common electrode CAR1 in the second direction X is equal to or larger than the width of the second source line S2 in the second direction X.

The main pixel electrode PA is located between the first source line S1 and the second source line S2 (i.e., between the first main common electrode CAL1 and the second main common electrode CAR1), and extends along the first direction Y.

The main pixel electrode PA is located inside of the pixel PX rather than the position right above the adjoining first source line S1 and second source line S2. More specifically, the main pixel electrode PA is arranged in the position of approximately middle between the first source line S1 and the second source line S2. That is, the main pixel electrode PA is arranged in the approximately middle portion between the first main common electrode CAL1 and the second main common electrode CAR1. The main pixel electrode PA extends from a vicinity of an upper end portion to a vicinity of a bottom end portion of the pixel PX.

The sub-pixel electrode PC is arranged in the upper end portion of the pixel PX, and connected with one end portion of the main pixel electrode PA. The sub-pixel electrode PC counters with the auxiliary capacitance line C1. In the illustrated example, the sub-pixel electrode PC is arranged on the auxiliary capacitance line C1. A portion of the sub-pixel electrode PC (pixel electrode PE) is connected with the connection electrode I through a contact hole which penetrates the second interlayer insulating film 13. The pixel electrode PE is electrically connected with the auxiliary capacitance electrode F11.

The sub-pixel electrode PC linearly extends from the main pixel electrode PA toward both-sides thereof, i.e., the first source line S1 and second source line S2 or the first main common electrode CAL1 and the second main common electrode CAR1, respectively. However, the sub-pixel electrode PC is arranged so that the sub-pixel electrode PC does not contact with the first main common electrode CAL1 and the second main common electrode CAR1. That is, the sub-pixel electrode PC is arranged so that the sub-pixel electrode PC is apart from the first main common electrode CAM and the second main common electrode CAR1. In the illustrated example, the main pixel electrode PA and the sub-pixel electrode PC are formed integrally or continuously.

The main common electrode CA1 and the pixel electrode PE can be formed in the same process using the same material. The main common electrode CA1 and the pixel electrode PE are formed of the electric conductive material which has light transmissive characteristics, such as Indium Tin Oxide (ITO) and Indium Zinc Oxide (IZO). However, the main common electrode CA1 and the pixel electrode PE may be formed of other metal materials, such as aluminum.

The first alignment film AL1 is arranged on a surface of the array substrate AR facing the counter substrate CT, and extends approximately whole area of the active area ACT. The first alignment film AL1 covers the pixel electrode PE and the main common electrode CA1, and is also formed on the second interlayer insulating film 13. The first alignment film AM contacts with the liquid crystal layer LQ. The first alignment film AL1 is formed of the material which shows a horizontal alignment characteristics.

On the other hand, the counter substrate CT is formed using a second transmissive insulating substrate 20, such as a glass substrate and a plastic substrate. The counter substrate CT includes a second main common electrode CA2 of the common electrode CE and a second alignment film AL2 on the surface of the second insulating substrate 20 facing the array substrate AR.

The main common electrode CA2 extends along the first direction Y. In addition, the illustrated main common electrode CA2 is arranged in two lines in parallel with the second direction X. Hereinafter, in order to distinguish the two lines, the main common electrode CA2 on the left-hand side in the figure is called a third main common electrode CAL2, and the main common electrode CA2 on the right-hand side in the figure is called a fourth main common electrode CAR2. The third main common electrode CAL2 counters with the first main common electrode CAL1. The fourth main common electrode CAR2 counters with the second main common electrode CAR1.

A black matrix arranged facing line portions such as the source line S, the gate line G, the auxiliary capacitance line C, and the switching element SW to define the respective pixels PX, color filter layers arranged corresponding to the pixels PX, and an overcoat layer to smooth the unevenness of the surface of the black matrix and the color filter layers may be formed on the counter substrate CT. The common electrode CA2 is formed of the electric conductive material which has light transmissive characteristics, such as ITO and IZO, for example.

The second alignment films AL2 is arranged on the surface of the counter substrate CT opposing the surface of the array substrate AR, and extends to approximately whole active area ACT. The second alignment films AL2 covers the main common electrode CA2 of the common electrode and the like. The second alignment film AL2 contacts with the liquid crystal layer LQ. The second alignment film AL2 is formed of material which has a horizontal alignment characteristics.

In the first and second alignment films AL1 and AL2, alignment treatment processing (for example, rubbing processing and photo alignment processing) is performed for making the liquid crystal display molecule in the initial alignment state. The first alignment treatment direction in which the first alignment film AL1 makes the liquid crystal molecule in the initial alignment direction and the second alignment treatment direction in which the second alignment film AL2 makes the liquid crystal molecule in the initial alignment direction, are respectively directions in parallel to the first direction Y or a slightly oblique direction D crossing the first direction Y. The first and second alignment treatment directions are in parallel, and in the same or opposite direction each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 3-7 μm cell gap, is formed, for example. The array substrate AR and the counter substrate CT are pasted together by seal material which is not illustrated, in which the predetermined cell gap is formed.

The liquid crystal layer LQ is held at the cell gap formed between the array substrate AR and the counter substrate CT and arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached to an external surface of the array substrate AR, i.e., the external surface of the first insulating substrate 10 which constitutes the array substrate AR by adhesives, etc. The first optical element OD1 contains a first polarization plate PL1 which has a first polarizing axis. Moreover, a second optical element OD2 is attached to an external surface of the counter substrate CT, i.e., the external surface of the second insulating substrate 20 which constitutes the counter substrate CT by adhesives, etc. The second optical element OD2 contains a second polarization plate PL2 which has a second polarizing axis. The first polarizing axis of the first polarization plate PL1 and the second polarizing axis of the second polarization plate PL2 are in a spatial relationship in which both of the first and second polarizing axes intersect perpendicularly, for example. One polarization plate is arranged, for example, so that its polarizing direction becomes the direction of the long axis of the liquid crystal molecule, i.e., in parallel to the first alignment treatment direction or the second alignment treatment direction (or in parallel to the first direction Y), or in an orthogonal direction (or in parallel to the second direction X). Thereby, normally black mode is achieved.

As shown in FIG. 3, at the time of non-electric field state, i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment treatment direction of the first alignment film AL1 and the second alignment treatment direction of the second alignment film AL2 as shown with a dashed line in FIG. 3. In this state, at the time of OFF, the alignment state corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane, and is explained as what rotates in a field in parallel with the X-Y plane.

Here, both of the first alignment treatment direction of the first alignment film AL1 and the second alignment treatment direction of the second alignment film AL2 are directions in parallel to the first direction Y or directions in parallel to the oblique direction D. At the time of OFF, the long axis of the liquid crystal molecule LM is aligned substantially in parallel to the first direction Y or the oblique direction D. That is, the direction for initial alignment of the liquid crystal molecule LM is in parallel to the first direction Y or the oblique direction D. In the example shown in FIG. 3, the initial alignment direction of the liquid crystal molecule LM is in parallel to the first direction Y.

In addition, when both of the first and second alignment treatment directions are in parallel, and are opposite each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment). In addition, when the respective directions of the alignment treatment of the first alignment film AL1 and the second alignment film AL2 are in parallel and the same each other, the liquid crystal molecule LM is aligned in the approximately horizontal direction (i.e., the pre tilt angle is approximately zero) in a cross-section of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment).

As shown in FIGS. 1, 3 and 5, a portion of the backlight from the backlight 4 enters into the liquid crystal display panel LPN after penetrating the first polarization plate PL1. The polarization state of the light which enters into the liquid crystal display panel LPN changes depending on the alignment state of the liquid crystal molecule LM when the light passes the liquid crystal layer LQ. At the time of OFF, the light which passes the liquid crystal layer LQ is absorbed by the second polarization plate PL2 (black display).

On the other hand, in case where the potential difference is formed between the pixel electrode PE and the common electrode CE (at the time of ON), the lateral electric field in parallel to the substrate (or oblique electric field) is formed between the pixel electrode PE and the common electrode CE. Thereby, the liquid crystal molecule LM rotates within a parallel plane with the substrate surface so that the long axis becomes in parallel with the direction of the electric field as shown in the dashed line in FIG. 3.

In the embodiment shown in FIG. 3, the liquid crystal molecule LM between the main pixel electrode PA and main common electrode CAL rotates counterclockwise to the first direction Y along with the lateral electric field between the main electrode PA and the main common electrode CAL, and is aligned so that the liquid crystal molecule LM may turn to the upper left in the figure. The liquid crystal molecule LM between the main electrode PA and the common main electrode CAR rotates clockwise to the first direction Y along with the lateral electric field between the main electrode PA and the common main electrode CAR, and is aligned so that the liquid crystal molecule LM may turn to the upper right in the figure.

Thus, in each pixel PX, when lateral electric field is formed between the pixel electrode PE and the common electrode CE, the alignment direction of the liquid crystal molecule LM is divided into at least two directions, and at least two domains are formed corresponding to respective alignment directions. That is, at least two domains are formed in each pixel PX.

At the time of ON, a portion of the backlight which entered into the liquid crystal panel LPN from the backlight 4 passes the first polarization plate PL1, and enters into the liquid crystal layer LQ. When the backlight which entered into the liquid crystal layer LQ passes through two regions (apertures) divided with the pixel electrode PE and the common electrode CE, respectively, the polarization state changes. At the time of ON, at least a portion of the backlight which passed the liquid crystal layer LQ penetrates the second polarizing plate PL2 (white display).

According to this embodiment, it becomes possible to form at least two domains in one pixel. Therefore, a viewing angle in at least two domains can be compensated optically, and a wide viewing angle is attained. Accordingly, it becomes possible to supply a high quality display device.

Moreover, the transmissivity of each domain in one pixel becomes equal by setting up the area of at least two apertures divided with the pixel electrode PE and the common electrode CE substantially equal in one pixel. Therefore, it becomes possible to achieve a uniform display with the wide viewing angle by compensating the light passing the respective apertures optically each other.

Furthermore, at the time of ON, since the lateral electric field is hardly formed (or sufficient electric field to drive the liquid crystal molecule LM is not formed) near the main pixel electrode PA of the pixel electrode PE and near the main common electrode CA of the common electrode CE, the liquid crystal molecule LM hardly moves from the initial alignment direction like at the time of OFF. For this reason, as mentioned-above, even if the pixel electrode PE and the common electrode CE are formed of the transmissive electric conductive material in the domains, the backlight hardly penetrates, i.e., hardly contributes to the display at the time of ON. Therefore, the pixel electrode PE and the common electrode CE do not necessarily need to be formed of a transparent electric conductive material, and may be formed using electric conductive materials, such as aluminum and silver.

Moreover, when an assembling shift occurs between the array substrate AR and the counter substrate CT, a difference may arises in distance between the respective common electrodes CE of the both sides and the pixel electrode PE. However, since the assembling shift is produced in common to all the pixels PX, there is no difference in the electric field distribution between the pixels PX, and the influence to the display of the image is negligible.

Figure 8:
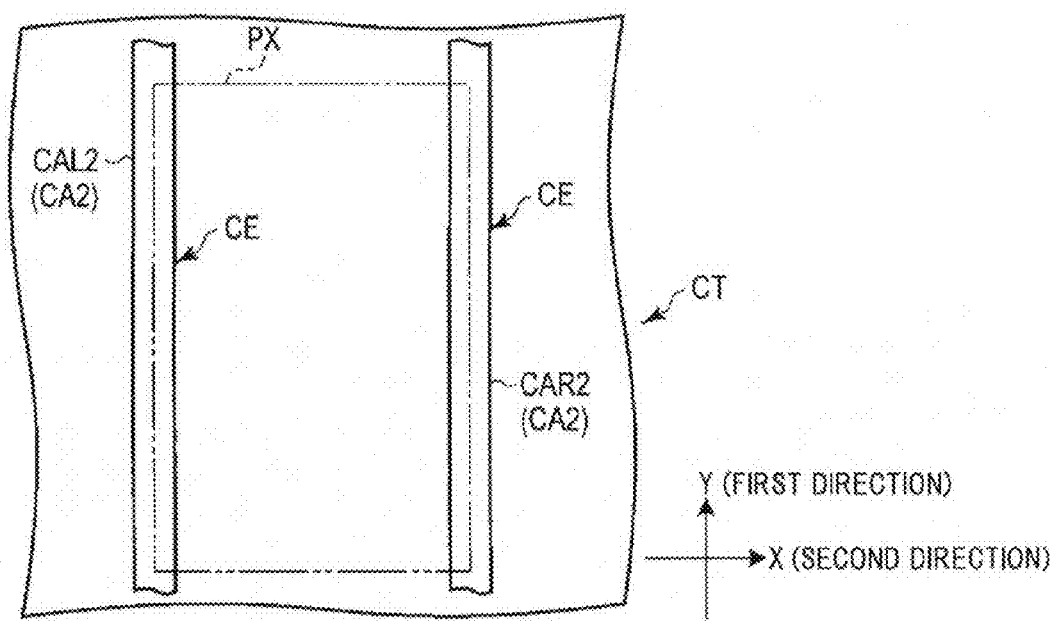
FIG. 8 is a plan view schematically showing a structure of one pixel in a counter substrate in the liquid crystal display panel.

FIG. 8 is a plan view schematically showing a structure of the counter substrate in one pixel in the liquid crystal display panel LPN. As shown in FIG. 8, the main common electrode CA2 is formed in a belt shape and linearly extends along the first direction Y. A plurality of main common electrodes CA2 is electrically connected. In the illustrated example, the main common electrode CA2 is formed in the shape of a stripe in the counter substrate CT.

Although not described in detail, the main common electrode CA2 of the common electrode CE is pulled out to the outside of the active area and electrically connected with the electric supply portion formed in the array substrate through an electric conductive component. Common potential is supplied to the main common electrode CA2. That is, the first main common electrode CAL1, the second main common electrode CAR1, the third main common electrode CAL2 and the fourth main common electrode CAR2 are electrically connected and set to the same potential.

In such structure, when displaying black on the pixel PX, potential difference or electric field is not formed between the pixel electrode PE containing the main pixel electrode PA and main common electrodes CA1 and CA2. On the other hand, when displaying white on the pixel PX, the electric field is formed by the potential difference between the pixel electrode PE containing the main pixel electrode PA and main common electrodes CA1 and CA2.

As illustrated, in this embodiment, two or more first shield electrodes (the first shield electrode H11, the first shield electrode H12, etc.) are arranged under the first source line S1, and the first main common electrode CAL1 is arranged above the first source line S1. For this reason, even if it is a case where white or black is displayed on the pixel PX, it becomes possible to shield undesirable electric field from the first source line S1 by the first main common electrode CAL1 and the first shield electrode.

Similarly, two or more second shield electrodes (the second shield electrode H21, the second shield electrode 1122, etc.) are arranged under the second source line S2, and the second main common electrode CAR1 is arranged above the second source line S2. For this reason, even if it is a case where white or black is displayed on the pixel PX, it becomes possible to shield undesirable electric field from the second source line S2 by the second main common electrode CAR1 and the second shield electrode.

The larger the width of the main common electrode CA1 becomes, the more the shield ability against the electric field from the source line S is improved. However, since the aperture which mainly contributes to the display is formed between the main common electrode CA1 and the main pixel electrode PA, if the width of the main common electrode CA1 becomes too wide, the area of the aperture becomes smaller, and reduction of transmissivity is resulted.

In this embodiment, the first main common electrode CAL1 is arranged right above the first source line S1 and has substantially the same width as the first source line S1. The second main common electrode CAR1 is arranged right above the second source line S2 and has substantially the same width as the second source line S2. Therefore, it is possible to raise the shield ability against the electric field from the first source line S1 and the second source line S2, while maintaining high transmissivity.

By shielding undesirable electric field from the source line S, it is possible to control that undesirable bias is impressed from the source line S to the liquid crystal layer LQ. Accordingly, it becomes possible to control generating of the display defect such as a cross talk, for example. The cross-talk is a phenomenon that in the state where the pixel is set to the pixel potential which displays black and the pixel potential which displays white is supplied to the source line, the luminosity is raised due to turbulence of the liquid crystal molecules contained in the liquid crystal layer LQ.

In this embodiment, the third main common electrode CAL2 and the fourth main common electrode CAR2 counter with the first main common electrode CAL1 and the second main common electrode CAR1, respectively. In the case, the main common electrode CA1 and the main common electrode CA2 are arranged above the source line S, respectively, the aperture AP which contributes to the display can be expanded as compared with the case where the main common electrode CA1 and the main common electrode CA2 are arranged on the main pixel electrode PA side rather than above the source line S, and it becomes possible to improve the transmissivity of the pixel PX.

Moreover, it becomes possible to expand the distances between the pixel electrode PA and the main common electrode CA2, and between the pixel electrode PA and the main common electrode CA1 by arranging each of the main common electrodes CA1 above the source line S and arranging each of the common electrodes CA2 above the main common electrode CA1. Therefore, it becomes possible to form the lateral electric field much closer to the horizontal direction. For this reason, it also becomes possible to maintain the wide viewing angle which is advantages of the general IPS mode.

Moreover, in a region in which the main common electrode CA1 faces the main common electrode CA2 through the liquid crystal layer, it becomes possible to suppress generating of undesirable vertical electric field. i.e., the electric field in a normal direction of the principal surface of the substrate.

The inventors performed a simulation using the liquid crystal display device according to this embodiment about isoelectric line at the time of impressing voltage between the pixel electrode PE and the main common electrodes CA1 and CA2. In addition, the film thickness of the second interlayer insulating film 13 is 2.0 µm, the width of the source line S is 4.0 µm, and the width of the main common electrode CA1 is 10.5 µm. The distance between the source line S and the main common electrode CA1 facing mutually is 3.25 µm, and the width of the shield electrode H is 4.0 µl m.

Figure 9:
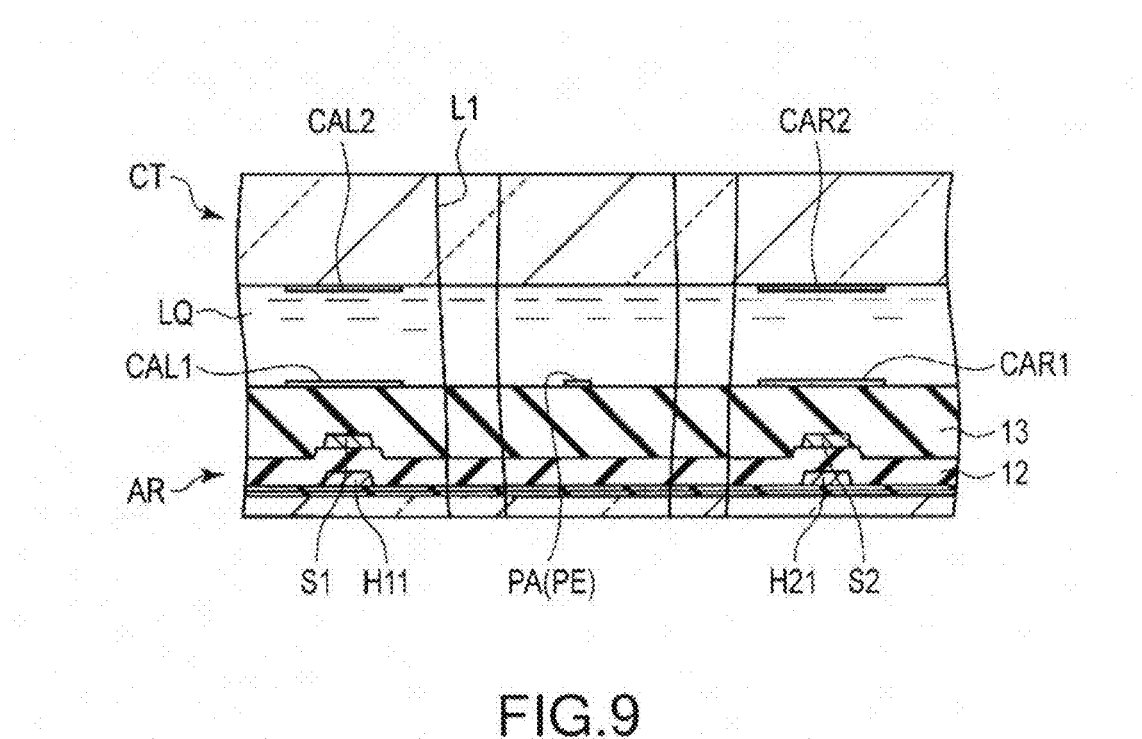
FIG. 9 is a schematic view schematically showing a simulation result about an equipotential line using the liquid crystal display device according to the embodiment.

FIG. 9 is a schematic view showing the result the simulation about the isoelectric line at the time of impressing voltage between the pixel electrode PE and main common electrodes CA1 and CA2 using the liquid crystal display device according to this embodiment. It turns out that there is almost no distortion in the isoelectric line L1. For this reason, in the liquid crystal display device in this embodiment, alignment disorder of the liquid crystal molecule LM becomes small, and the cross talk can be reduced.

The inventors also performed the simulation using a liquid crystal display device according to a comparative example about the isoelectric line at the time of impressing voltage between the pixel electrode PE and main common electrodes CA1 and CA2. In addition, the liquid crystal display device according to the comparative example is constituted in a similar way to the liquid crystal display device according to the embodiment except that the shield electrode H is not provided.

Figure 10:
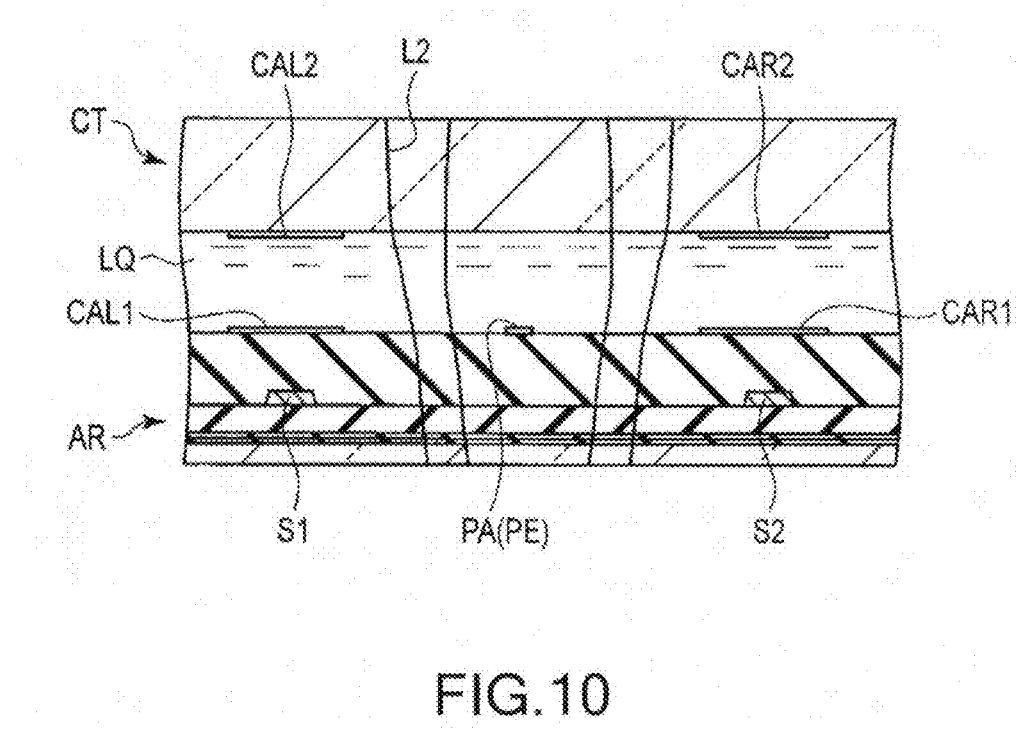
FIG. 10 is a view schematically showing a simulation result about the equipotential line using a liquid crystal display device according to a comparative example.

FIG. 10 is a schematic view showing the result of the simulation about the isoelectric line at the time of impressing voltage between the pixel electrode PE and main common electrode CA1 and CA2 using the liquid crystal display device according to the comparative example. It turns out that the distortion of the isoelectric line L2 is larger than the isoelectric line L1 as shown in FIG. 10. For this reason, in the liquid crystal display device in the comparative example, the alignment disorder of the liquid crystal molecule LM becomes larger than the disorder of the embodiment, and it is difficult to take a measure against the cross talk.

Figures 11A, 11B:
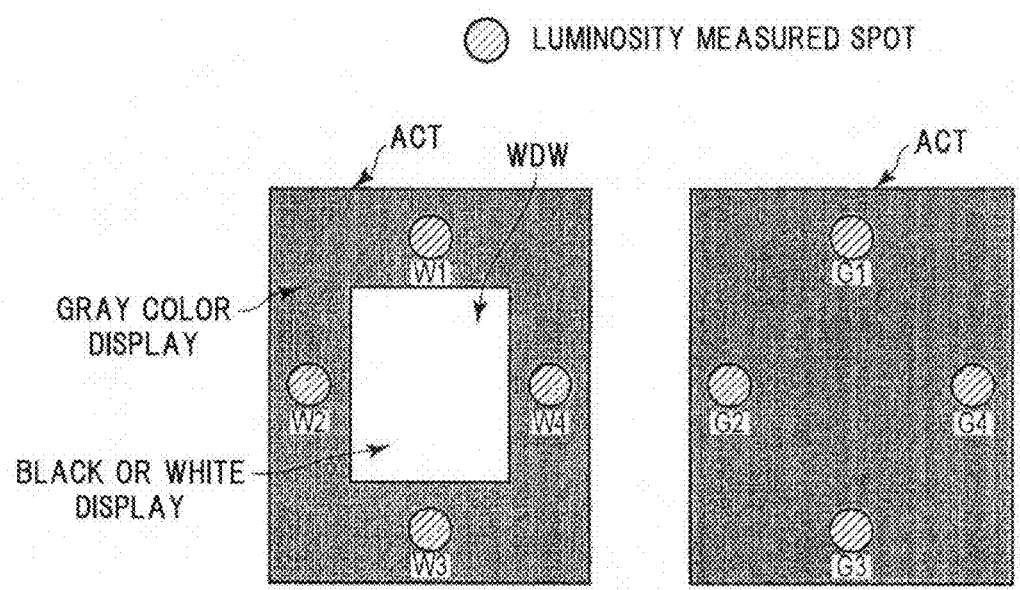
FIGS. 11A and 11B are views for explaining a cross-talk rate introduced in the embodiment.

Moreover, the inventors verified the effect of the embodiment. Next, the way of the above-mentioned verification and its result are explained. FIGS. 11A and 11B are figures for explaining the definition of a cross talk rate introduced in this embodiment.

As shown in FIG. 11A, luminosity was measured using a pattern in which a window WDW is formed in an approximately center portion of the active area ACT. The luminosities of four spots located in four directions adjacent to the window WDW were measured. Here, while black image and white image are displayed in the window WDW, the peripheral region displays gray color image. The respective luminosities of four spots shown in FIG. 11A are denoted by W1, W2, W3, and W4. Next, as shown in FIG. 11B, the luminosities of the same four spots as shown in FIG. 11A were measured when same gray color image was displayed in the whole active area. The respective luminosities of the four spots are denoted as G1, G2, G3, and G4. In this case, the cross talk rate is defined as follows.

Cross talk rate=$|W(n)-G(n)|/G(n) \times 100$ (here,$n=1$ to 4)

First, the cross talk rate of the liquid crystal display device was measured about the comparative example. Then, the cross talk rate about the same structure as the embodiment was measured.

(In Case White is Displayed in the Window WDW)
When the cross talk rate of the comparative example was standardized as 1, the cross talk rate of the embodiment was 0.34. It turns out that the cross talk rate was improved by 66%.

(In Case Black is Displayed in the Window WDW)
When the cross talk rate of the comparative example was standardized as 1, the cross talk rate of the embodiment was 0.52. It turns out that the cross talk rate was improved by 48%.

As explained above, it was verified that it becomes possible to reduce the cross talk rate according to this embodiment, and also possible to supply a high quality liquid crystal display device.

For example, other interlayer insulating films may intervene between the main common electrode CA1 and the pixel electrode PE, and the main common electrode CA1 and the pixel electrode PE may be formed in a different layer each other. In this case, the main common electrode CA1 may be formed of materials different from the pixel electrode PE, and also may be formed of the same materials as the pixel electrode PE.

Moreover, the gate line G may be arranged at the upper end portion of the pixel PX, and the auxiliary capacitance line C may be arranged approximately in the central portion of the pixel PX. In this case, the sub-pixel electrode PC is arranged approximately in the central portion of the pixel and counters with the auxiliary capacitance line C.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
a first substrate including;
    a first insulating layer,
    a shield electrode arranged on the first insulating layer and extending along a first direction,
    an auxiliary capacitance line arranged on the first insulating layer and extending in a second direction orthogonally crossing the first direction, the auxiliary capacitance line integrally formed with the shield electrode,
    a second insulating layer formed on the first insulating layer and the shield electrode,
    a source line arranged on the second insulating layer facing the shield electrode and extending in the first direction,
    a third insulating layer formed on the second insulating layer and the source line,
    a first main common electrode formed on the third insulating layer facing the source line and extending in the first direction,
    a main pixel electrode formed on the third insulating layer apart from the first main common electrode in the second direction and extending in the first direction, and
a second substrate including;
    a second main common electrode facing the first main common electrode and extending in the first direction,
a liquid crystal layer held between the first and second substrates and having liquid crystal molecules;
wherein the first and second main common electrodes are set to the same electric potential.

2. A liquid crystal display device, comprising:
a first substrate including;
    a first insulating layer,
    a first shield electrode and a second shield electrode arranged on the first insulating layer and extending along a first direction, the first and second shield electrodes locating apart from each other in a second direction orthogonally crossing the first direction,
    a second insulating layer formed on the first insulating layer and the first and second shield electrodes, a first source line arranged on the second insulating layer facing the first shield electrode and extending in the first direction, a second source line arranged on the second insulating layer facing the second shield electrode and extending in the first direction, a third insulating layer formed on the second insulating layer and the first and second source lines, a first main common electrode formed on the third insulating layer facing the first source line and extending in the first direction, a second main common electrode formed on the third insulating layer facing the second source line and extending in the first direction, a main pixel electrode formed on the third insulating layer so as to locate between the first and second main common electrodes and extend in the first direction, and a second substrate including;

a third main common electrode facing the first main common electrode and extending in the first direction, a fourth main common electrode facing the second main common electrode and extending in the first direction, and a liquid crystal layer held between the first and second substrates and having liquid crystal molecules;

wherein the first, second, third and fourth main common electrodes are set to the same electric potential.

3. The liquid crystal display device according to claim 2, wherein the first shield electrode is arranged under the first source line and has substantially the same width as the first source line, and the second shield electrode is arranged under the second source line and has substantially the same width as the second source line.

4. The liquid crystal display device according to claim 3, wherein the first main common electrode is arranged on the first source line and has substantially the same width as the first source line, and the second main common electrode is arranged on the second source line and has substantially the same width as the second source line.

5. The liquid crystal display device according to claim 2, wherein the distance between the first source line and the main pixel electrode is substantially the same as the distance between the second source line and the main pixel electrode.

6. The liquid crystal display device according to claim 2, wherein initial alignment direction of the liquid crystal molecule of the liquid crystal layer is a direction substantially in parallel with the first direction or an oblique direction inclining from the first direction.

7. The liquid crystal display device according to claim 2, wherein the first substrate further includes a first alignment film contacting the liquid crystal layer, the second substrate further includes a second alignment film contacting the liquid crystal layer, and a first alignment treatment direction in which the first alignment film initially aligns the liquid crystal molecules of the liquid crystal layer and a second alignment treatment direction in which the second alignment film initially aligns the liquid crystal molecules of the liquid crystal layer are directions in parallel with the first direction or an oblique direction inclining from the first direction.

8. A liquid crystal display device, comprising:

a first substrate including;

a first insulating layer, a first shield electrode and a second shield electrode arranged on the first insulating layer and extending along a first direction, the first and second shield electrodes locating apart from each other in a second direction orthogonally crossing the first direction, an auxiliary capacitance line arranged on the first insulating layer and extending in the second direction, the auxiliary capacitance line integrally formed with the first and second shield electrodes, a second insulating layer formed on the first insulating layer and the first and second shield electrodes, a first source line arranged on the second insulating layer facing the first shield electrode and extending in the first direction, a second source line arranged on the second insulating layer facing the second shield electrode and extending in the first direction, a third insulating layer formed on the second insulating layer and the first and second source lines, a first main common electrode formed on the third insulating layer facing the first source line and extending in the first direction, a second main common electrode formed on the third insulating layer facing the second source line and extending in the first direction, a main pixel electrode formed on the third insulating layer so as to locate between the first main common electrode and the second main common electrode, and extend in the first direction, and a second substrate including;

a third main common electrode facing the first main common electrode and extending in the first direction, a fourth main common electrode facing the second main common electrode and extending in the first direction, and a liquid crystal layer held between the first substrate and the second substrate and having liquid crystal molecules;

wherein the first, second, third and fourth main common electrodes are set to the same electric potential.

9. The liquid crystal display device according to claim 8, wherein the first shield electrode is arranged under the first source line and has substantially the same width as the first source line, and the second shield electrode is arranged under the second source line and has substantially the same width as the second source line.

10. The liquid crystal display device according to claim 9, wherein the first main common electrode is arranged on the first source line and has substantially the same width as the first source line, and the second main common electrode is arranged on the second source line and has substantially the same width as the second source line.

11. The liquid crystal display device according to claim 8, wherein the first substrate further includes an auxiliary capacitance electrode covered with the first insulating layer, facing the first shield electrode and the auxiliary capacitance line and electrically connected with the main pixel electrode.

12. The liquid crystal display device according to claim 11, wherein a region of the auxiliary capacitance electrode, which faces the first main common electrode is arranged right under the first shield electrode and has substantially the same width as the first source line, and a region of the auxiliary capacitance electrode, which faces the auxiliary capacitance line is arranged right under the auxiliary capacitance line and has substantially the same width as the auxiliary capacitance line.

13. The liquid crystal display device according to claim 11, further comprising:

a semiconductor layer including a source region formed in the same layer as the auxiliary capacitance electrode by the same material as the auxiliary capacitance electrode, facing the first source line and electrically connected with the first source line, a drain region continuously formed with the auxiliary capacitance electrode, and a channel region; and a gate line formed in the same layer as the first and second shield electrodes and the auxiliary capacitance line, facing the channel region through the first insulating layer, and extending in the second direction.

14. The liquid crystal display device according to claim 8, wherein the distance between the first source line and the main pixel electrode is substantially the same as the distance between the second source line and the main pixel electrode in the second direction.

15. The liquid crystal display device according to claim 8, wherein initial alignment direction of the liquid crystal molecule of the liquid crystal layer is a direction substantially in parallel with the first direction or an oblique direction inclining from the first direction.

16. The liquid crystal display device according to claim 8, wherein the first substrate further includes a first alignment film contacting the liquid crystal layer, the second substrate further includes a second alignment film contacting the liquid crystal layer, and a first alignment treatment direction in which the first alignment film initially aligns the liquid crystal molecules of the liquid crystal layer and a second alignment treatment direction in which the second alignment film initially aligns the liquid crystal molecules of the liquid crystal layer are directions in parallel with the first direction or an oblique direction inclining from the first direction.

\* \* \* \* \*